United States Patent Office 3,218,729
Patented Nov. 23, 1965

3,218,729
DRYING WET GRANULAR SOLID MATERIALS
Frank T. Micklich, Midland, Mich., assignor to The Dow Chemical Company, Midland, Mich., a corporation of Delaware
Filed Jan. 15, 1962, Ser. No. 166,320
3 Claims. (Cl. 34—10)

This invention relates to the solvent recovery drying of damp granular materials. More specifically, this invention relates to an improved process of drying granular polymer products such as polymers of α-olefins wetted with an organic liquid, particularly such products obtained by the polymerization of α-olefins in the presence of inert organic liquid reaction media.

Various processes are known for producing polymers of α-olefins such as ethylene, propylene, etc. by carrying out the polymerization in the presence of such catalysts as: (1) a mixture of a trialkyl aluminum compound and a compound of a heavier metal of group IV–B, V–B or VI–B of the periodic system of the elements, (2) chromium oxide or a mixture of chromium oxide and strontium oxide associated with at least one oxide as a supporting material selected from the group consisting of silica, alumina, zirconia and thoria, (3) molybdenum oxide with alumina as a supporting material, (4) nickel and/or cobalt with charcoal as a supporting material and (5) an organic peroxide of the general formula

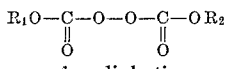

where $R_1$ and $R_2$ may be aliphatic, aromatic, cycloparaffinic or unsaturated radicals. Such polymers are well described in the literature. Polyolefin Resin Processes by Marshall Sittig published in 1961 by the Gulf Publishing Company, Houston, Texas, gives a description of the composition and preparation of these types of polymers.

In such polymerization processes, inert organic liquids are often employed as reaction media. Suitable media include paraffins, cycloparaffins and/or natural or synthetic hydrocarbons with low to medium boiling ranges. Specific examples are propane, butane, pentane, hexane, heptane, cyclohexane, alkylated cyclohexane, benzene, toluene, kerosene and diesel oil. The resulting polymerization reaction products are often obtained in the form of slurries of said polymers suspended in the liquid media, from which the solid polymer is commonly separated by filtration or decantation as a granular material wet with residual liquid. It is usually necessary to carry out further operations on such wet granular material to obtain a dry granular material and at the same time to recover the residual liquid. Wet granular material is also obtained in many other kinds of processes, such as other polymerization processes, chemical reactions in liquid reaction media, crystallization in solvent-nonsolvent liquids, precipitations, etc.

An object of the present invention is to provide a process for drying granular material wetted with volatile liquid to obtain dry granular material and to recover the volatile liquid.

Another object is to provide such a process having relatively short time of contact with heat exchange means.

A further object is to provide such a process having good thermal efficiency.

A still further object is to provide such a process for drying granular polymers wetted with volatile organic liquids to obtain dry granular polymer products and to recover the organic liquids. Additional objects and advantages of the method will be apparent in the following description.

These and other related objects are achieved according to the present invention in a process for drying a wet granular solid material which is wetted with a volatile liquid to obtain practically dry granular material and to recover the volatile liquid.

Figure 1:
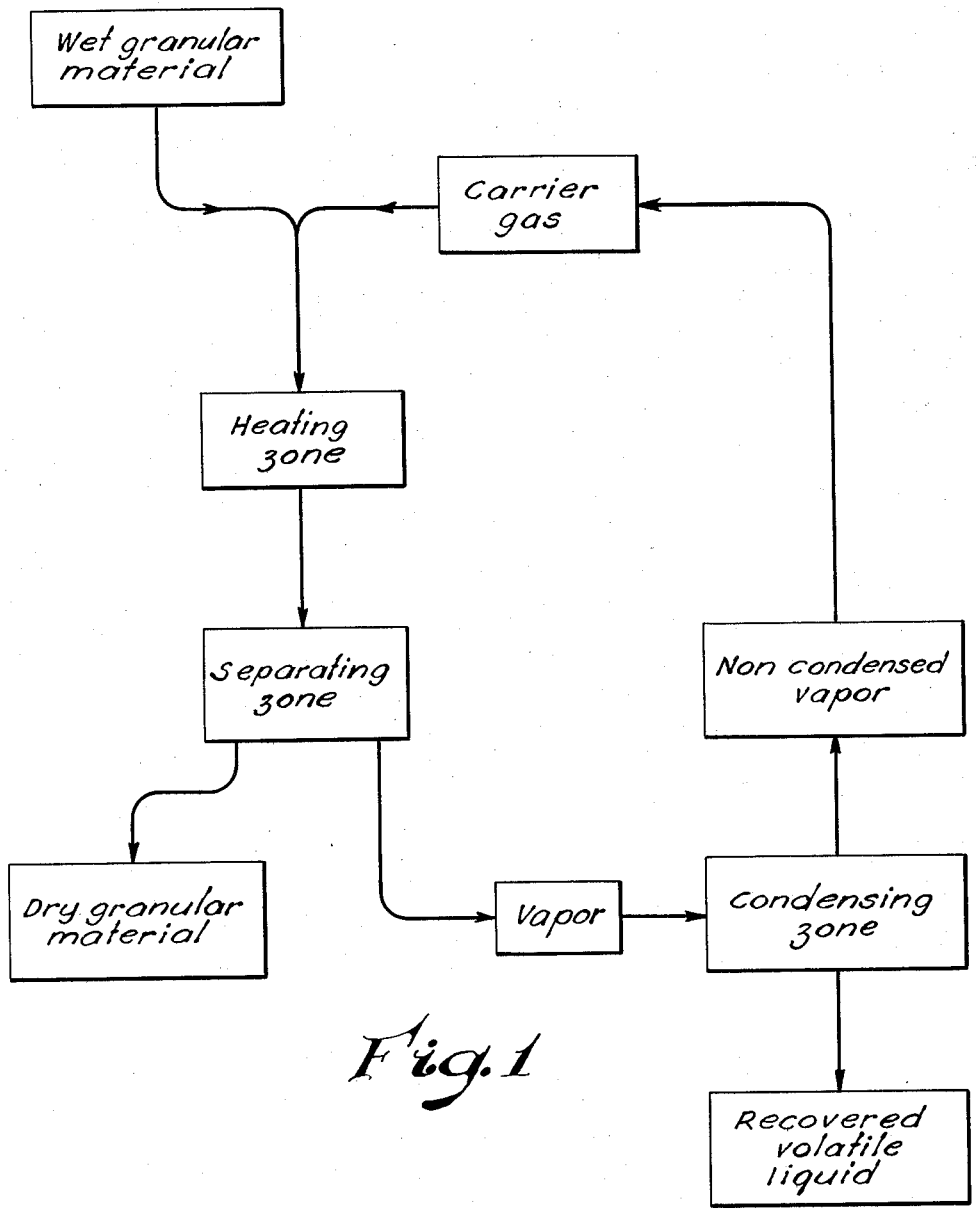
FIGURE 1 is a flow sheet showing diagrammatically the steps of the process.

As shown in FIGURE 1, the process is carried out with a wet granular solid material wetted with a volatile liquid as starting material. The wet granular solid starting material is conveyed into a heating zone by means of a carrier gas. This carrier gas will be more fully described hereinafter.

In the heating zone, the wet granular starting material, transported through the heating zone by the carrier gas, is heated by contact with heat transfer surfaces to vaporize the liquid with which the starting granular material is wetted.

The resulting mixture of granular solid material and vapors which comprise the starting carrier gas and vapors of the volatilized liquid is passed co-currently through the heating zone and thence to a solid-vapor separating zone.

From the solid-vapor separating zone the granular solid material is collected in substantially dry condition, i.e. having little or no residual liquid remaining thereon.

The vapor from the solid-vapor separating zone passes to a condensing zone wherein at least a portion of the vapors of the liquid volatilized from the starting wet granular solid material is condensed and is thereby recovered for further use.

The non-condensed vapors from the condensing zone pass back ot the heating zone as the carrier gas for conveying further amounts of starting wet granular material through the process.

It will be seen that the described process provides means for separating the starting wet granular material and recovering therefrom the granular solid portion in practically dry condition and the volatile liquid portion substantially completely, i.e. without appreciable loss.

In order to perform its function of conveying the wet solid granular starting material into the heating zone and through the described process, the carrier gas is one which is unreactive with the components of the starting wet granular material and is neither a solvent for nor is dissolved by the solid material at the prevailing conditions. The carrier gas is further characterized as one which is gaseous at the actual temperature of the starting wet granular material which prevails when the carrier gas is admixed with such starting wet granular material for introduction into the heating zone. At least one component of the carrier gas is a material whose boiling point is below the actual temperature of the wet granular starting material and is conveniently a material which is a gas at standard conditions. Examples of such materials are nitrogen, air, carbon dioxide, methane, argon, and other inert gases. A material which is normally a liquid may be used in the gaseous form as the carrier gas when the actual temperature of the wet granular starting material is above its boiling point. The carrier gas may be a mixture of such materials. It can also, and usually does, contain non-condensed vapors of the liquid with which the starting wet granular material is wetted, provided that the dew point of such vaporous mixture is not appreciably higher than the actual temperature of the wet granular starting material. In some instances a small amount of condensation of liquid out of the carrier gas onto the wet starting granular material can be tolerated but an excessive extent of such condensation causes difficulties in conveying the resulting feed mixture into the heating zone and should be avoided.

The several steps of the process are carried out at conditions dictated at least in part by the nature of the materials involved. Thus, the temperature to which the material is heated in the heating zone is such that the volatile liquid with which the granular starting material is wetted is fully vaporized but below the temperature at which any component decomposes or the solid granular material melts. In some instances it may be advantageous to carry out all or a part of the process under reduced pressure and/or under superatmospheric pressure.

In the condensing zone, it is desirable to condense from the vapors fed thereto as much of the volatile liquid component as is practically possible. However, it is a feature of the present process that any of the valuable volatile liquid from the wet granular starting material which is not condensed in the condensing zone is not lost from the process but is recycled in the carrier gas and is eventually recovered substantially completely.

Figure 2:
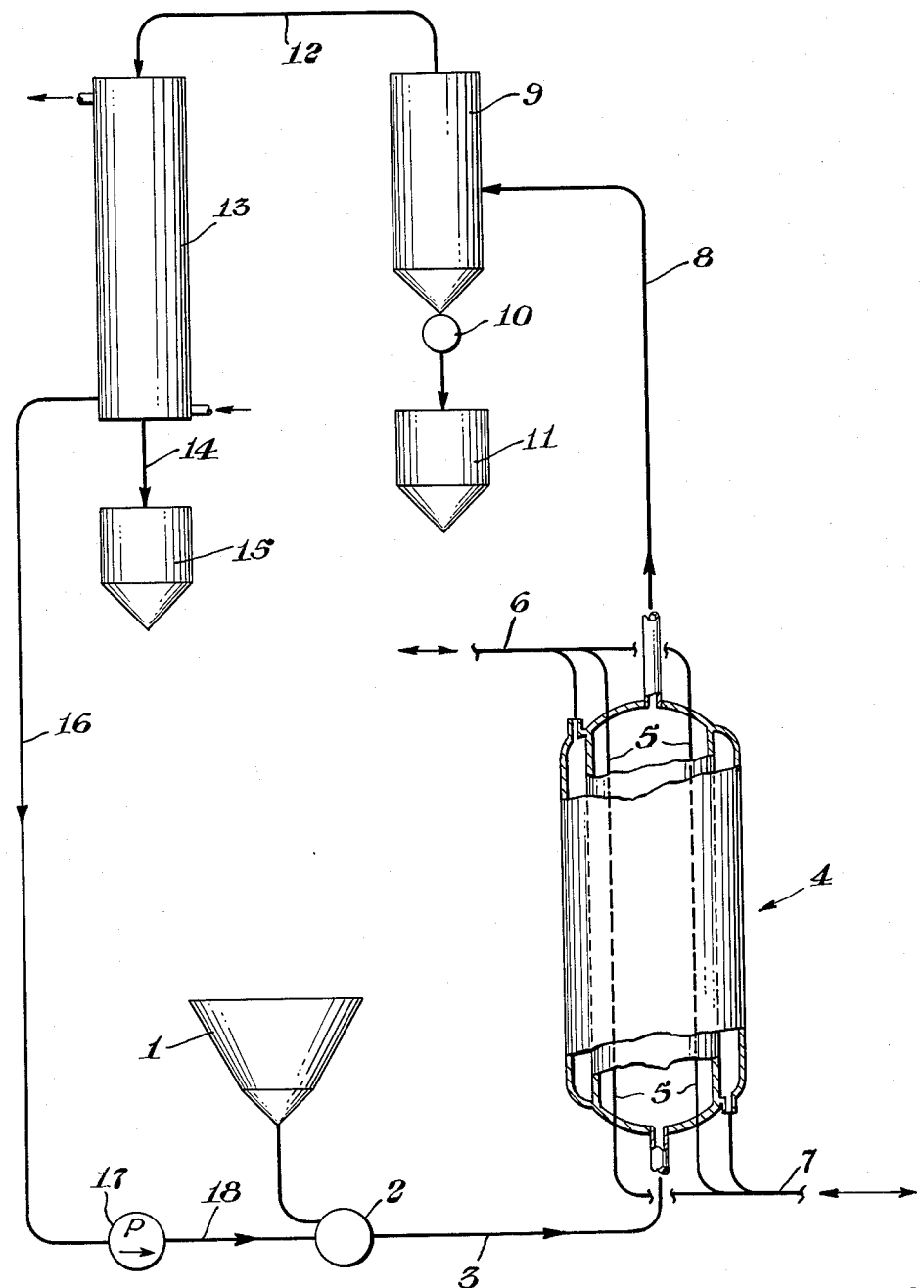
FIGURE 2 is a drawing showing diagrammatically the principal elements of one arrangement of apparatus suitable for carrying out the process.

Reference is made to FIGURE 2 of the drawing for one arrangement of apparatus suitable for carrying out the process.

As shown in FIGURE 2, granular starting material wet with a volatile liquid is fed from source 1 through a fluidizer valve 2 together with a carrier gas from line 18 via line 3 into the bottom of a vertically disposed heater 4. Heater 4, portrayed diagrammatically in vertical cut-away section, is shown as an elongated vertical jacketed shell having therein a plurality of vertically disposed heat transfer tubes 5. A suitable heat transfer fluid such as steam is passed from a source not shown via lines 6 and 7 through jacket and tubes of the heater. Other heaters presenting heat transfer surfaces to the mixture of granular solid and vapors passing through the heater can be used in place of the one shown.

In the heater 4, the flow of the gas-solid mixture is maintained co-currently upward. The flow can be such that the solid granular material forms a fluidized bed therein, preferably of the so-called low density type. Alternatively, the composition of the mixture and its flow can be such that the solid particles are carried by the vapors, preferably in what is known as a relatively dense solid-gas stream.

During passage of the feed materials through the heater 4, the liquid with which the granular material is wetted vaporizes, adding to the volume of gaseous material.

Immediately after start-up of the process, granular solid material accumulates in heater 4. The rate at which solid material, entrained in the vapor stream, passes out of the top of the heater increases as the amount of solid material accumulates therein until a steady state of equilibrium is attained at which the rate of flow of material out of the heater is the same as the rate of feed of material thereto.

The mixture of granular solid material and vapor produced in heater 4 is passed via line 8 to a vapor-solid separator 9, suitably a cyclone separator from which the practically dry granular solid product is discharged through suitable means such as rotary valve 10 to a receiver 11.

The vapor from vapor-solid separator 9 is passed via line 12 to condenser 13 wherein at least a part of the vaporized liquid constituents is condensed and the recovered liquid condensate is discharged via line 14 to receiver 15.

The non-condensed gases from condenser 13 are passed via line 16 (which may optionally contain a filter not shown) to a suitable gas pump 17 and thence via line 18 to the fluidizing valve 2 previously described. In an actual construction of such apparatus there would, of course, be included various valves, temperature and flow meters and controllers, and other appurtenances known to the chemical engineering arts.

In order to further illustrate the invention, but without being restricted thereto, the following example is given.

*Example I*

Polyethylene was prepared following well known procedures by polymerizing ethylene in the presence of a catalytic mixture of aluminum triethyl and titanium tetrachloride dispersed in hexane. The reaction product was removed from the reactor and centrifuged to obtain a liquid filtrate and a granular solid cake containing 37.9 percent by weight hexane. The granular solid polymer wet with hexane was dried and the hexane recovered therefrom in accordance with this invention in an assembly of apparatus substantially as shown in FIGURE 2 of the drawing. The wet granular polymer, at a temperature of 90° F., was introduced into a line running to the heater along with a carrier gas composed of a 30:70 weight mixture of nitrogen and hexane vapors. The wet polymer was fed at the average rate of 1500 pounds per hour (dry basis). The carrier gas was supplied at the average rate of 30 cubic feet per minute and a temperature of 112° F. A feed ratio of from 1 to 1.5 pounds of wet polymer per cubic foot of carrier gas was maintained. The materials were fed into the shell side of an in-line, indirect-type heater fitted with jacket and internal vertical tubes as described above. Heat was supplied to the heater by 10 p.s.i.g. steam at 238° F. A fluidized bed formed in the heater. The flow velocity at the lower end of the heater was 0.5 to 1.0 foot per second and at the upper end of the heater was 1.0 to 2.0 feet per second. The materials were heated to a temperature of 155° F. with good thermal efficiency and with only relatively short contact time in the heater. The resulting conveyed stream emerging from the heater was composed of essentially dry polymer powder suspended in a mixture of hexane and nitrogen vapors. The polymer powder was separated from the vapors in a pair of series connected cyclone separators. The hexane content of the dry powder collected in the receiver was 3.8 percent by weight. Thus, 93 percent of the hexane was volatilized. The vapors passed from the cyclone separators into a condenser whose inlet temperature was 155° F. and whose outlet temperature was 112° F. Hexane was condensed and collected in the receiver at an average rate of 855 pounds per hour. Vapors of hexane which were not condensed in the condenser passed along with the nitrogen, and the mixture was returned as the aforementioned carrier gas for conveying the starting wet granular polymer to the heater.

By this process, the granular polymer was recovered as a practically dry granular product and the hexane was recovered substantially without loss.

In place of the particular polymer wetted with hexane shown as the starting wet granular material in the foregoing example there can be used other granular solid materials wetted with volatile liquids with substantially the same results.

What is claimed is:

1. A process for drying finely divided granular polyethylene wetted with liquid hexane to obtain practically dry granular polyethylene and to recover the liquid hexane, which comprises conveying the wet polyethylene starting material by means of a carrier gas into the bottom of a vertically disposed heating zone, the carrier gas being a mixture of nitrogen and vapors of hexane and having a dew point not appreciably higher than the actual temperature of the wet granular polyethylene starting material, maintaining the granular polyethylene as a fluidized bed in the heating zone, heating the fluidized bed by indirect heat exchange means to vaporize the hexane, passing the resulting fluid solid-gas mixture co-currently upward through the heating zone and to a separating zone, separating the solid granular polyethylene from the vaporous material and collecting the resulting practically dry granular polyethylene, passing the vaporous material to a condensing zone, condensing a part of the hexane, collecting the resulting liquid hexane condensate and providing a non-condensed vapor mixture of nitrogen and vapors of hexane such that the dew point of the mixture is not appreciably above the actual temperature of the hexane-wet granular polyethylene starting material, and passing said non-condensed vapor mixture back to the heating zone as the aforementioned carrier gas for conveying the wet granular polyethylene starting material.

2. A process for drying a starting wet finely divided granular solid material which is wetted substantially on the surface with a volatile liquid to obtain practically dry granular solid material and to recover the volatile liquid by conveying the starting wet granular solid material by means of unheated carrier gas into the bottom of a vertically disposed heating zone, the carrier gas being a mixture of a material which is a gas at standard conditions and inert with respect to the wet granular material and vapors of the same volatile liquid as that wetting the surface of the starting wet granular solid material, such vapors substantially saturating the carrier gas such that the dew point of the mixture is not appreciably higher than the actual temperature of the starting wet granular solid material, maintaining the granular material as a fluidized bed in the heating zone, heating the fluidized bed by indirect heat exchange means and contact with heat transfer surfaces in the heating zone to vaporize the volatile liquid, passing the resulting solid-gas mixture co-currently upward through the heating zone and to a separating zone, separating the solid granular material from the vaporous material and collecting the resulting practically dry granular solid material, passing the vaporous material to a condensing zone and condensing a part of the volatile liquid vapors, collecting the resulting liquid condensate and providing a non-condensed vapor mixture of the material which is a gas at standard conditions and vapors of the volatile liquid such that the vapors of the liquid substantially saturate the non-condensed vapor mixture and that the dew point of the mixture is not appreciably higher than the actual temperature of the starting wet granular solid material, and passing the non-condensed vapor mixture back to the heating zone as the aforementioned carrier gas for conveying the wet granular solid starting material.

3. A process according to claim 2 wherein the granular solid material is a polymer of an $\alpha$-olefin.

References Cited by the Examiner
UNITED STATES PATENTS

| | | | |
|---|---|---|---|
| 1,277,895 | 9/1918 | Foster | 34—77 X |
| 1,402,467 | 1/1922 | Zimmerman. | |
| 1,686,719 | 10/1928 | Wood. | |
| 1,912,910 | 6/1933 | Neuman | 34—57 X |
| 2,066,418 | 1/1937 | O'Mara. | |
| 2,460,546 | 2/1949 | Stephanoff | 34—57 X |
| 3,112,188 | 11/1963 | Zehnder | 34—77 |

PERCY L. PATRICK, *Primary Examiner.*

NORMAN YUDKOFF, *Examiner.*